United States Patent [19]

Mehrotra et al.

[11] Patent Number: 5,098,683

[45] Date of Patent: Mar. 24, 1992

[54] POTASSIUM FLUORIDE STABILIZED AMMONIUM NITRATE AND METHOD OF PRODUCING POTASSIUM FLUORIDE STABILIZED AMMONIUM NITRATE

[75] Inventors: Ashok K. Mehrotra, Williamson, Ill.; I. Lee Markovich, Wickenburg, Ariz.

[73] Assignee: Olin Corporation, Cheshire, Conn.

[21] Appl. No.: 665,628

[22] Filed: Mar. 6, 1991

[51] Int. Cl.$^5$ .......................... C01B 21/50; C01C 1/18
[52] U.S. Cl. .................................. 423/266; 423/396; 23/302 A; 149/46
[58] Field of Search ............ 423/396, 266; 23/302 A; 149/46

[56] References Cited

U.S. PATENT DOCUMENTS 4,336,085  1/1982  Walker et al. .................. 149/45
4,552,736  11/1986  Mishra .......................... 423/266

Primary Examiner—Gary P. Straub
Assistant Examiner—Timothy C. Vanoy
Attorney, Agent, or Firm—John R. Wahl

[57] ABSTRACT

A phase stabilized ammonium nitrate mixed crystal structure is produced by the addition of potassium fluoride. Thus the undesirable abrupt expansion and contraction of ammonium nitrate in the temperature range of use in rocket motor propellants and explosives ($-55°$ C. to $\lambda°$ C.) is eliminated. The mixture is made by the addition of between about 3% to 5% and preferably about 3.5% by weight potassium fluoride to the ammonium nitrate by a nonhazardous aqueous method.

8 Claims, No Drawings

POTASSIUM FLUORIDE STABILIZED AMMONIUM NITRATE AND METHOD OF PRODUCING POTASSIUM FLUORIDE STABILIZED AMMONIUM NITRATE

BACKGROUND OF THE INVENTION

The present invention relates to ammonium nitrate and more particularly to a crystalline growth inhibitor for ammonium nitrate.

Ammonium nitrate (AN) is used in solid propellant formulations for gas generators, rocket motors and in explosives. One major disadvantage with AN is that it is well recognized as being inherently dimensionally unstable when heated or cooled. Pure and dry ammonium nitrate (AN) exists in at least five different polymorphic forms at atmospheric pressure. When heated, AN experiences about a 3% volumetric contraction at $-18°$ to $0°$ C. and about a 3.5% volumetric expansion between $32°$ to $50°$ C. Upon cooling, the reverse occurs but at different temperatures with a resultant net volumetric change after thermal cycling.

Considerable hysteresis occurs within any of these transitions. For example, the phase II to III transition occurs anywhere between $46°$ C. and $84°$ C. The phase III to II transition occurs between $84°$ C. and $90°$ C. The phase IV to III transition occurs with considerable hysteresis, between $32°$ C. and $55°$ C. and III to IV between $-1°$ C. to $35°$ C.

Unfortunately, this expansion and contraction occurs in the temperature range of use in rocket motors and explosives, in particular, in the range of $-55°$ C. to $80°$ C. There have been catastrophic failures of rocket motors, as a result of the excessive pressures caused by these volumetric changes. A straight forward solution to prevent such failures is therefore of great interest to propellant designers.

One solution to this dimensional instability problem is to introduce 10% to 17% by weight of potassium nitrate to the AN. However, this approach results in large amounts of undesirable residues in the combustion products. These residues tend to plug and corrode the rocket nozzle.

Another solution is described in U.S. Pat. No. 4,552,736. This patent describes the addition of 0.5% to 2.0% by weight of potassium fluoride (KF) as a specific crystal growth inhibitor to the molten phase of AN. However, our experiments have shown that this percentage range of KF does not consistently produce the desired result of true phase stabilization. The hot melt process as described in this patent is also very hazardous to perform. The hot melt process requires heating anhydrous AN to above its melting point of $167°$ C., adding and mixing anhydrous KF with the AN, and then spray drying the stabilized AN in a chilled condition. This process is inherently susceptible to production of unwanted and uncontrolled AN combustion.

In our experiments, there were indications that propellant formulations having AN with 2% KF did not become stabilized when prepared by using either the hot melt method described in U.S. Pat. No. 4,552,736 or an aqueous method of preparation. In these experiments, separate batches of an OMAX 451 gas generator propellant formulation were prepared. OMAX 451 is a proprietary propellant formulation which is available from Olin Corporation. This formulation is a propellant mix of AN with cis-polybutadiene polymer as a binder. The AN used in this formulation, which included 2.0% KF, was made by both the hot melt method and the aqueous method. The resultant OMAX 451 propellant formulation crystals were formed into grains which were then subjected to hot and cold thermal cycling to determine the amount of volumetric growth. The results are given below in Table 1.

TABLE 1

| THERMAL CYCLING DATA OF "OMAX" 451 (CIS POLYBUTADIENE) PROPELLANT | | |
|---|---|---|
| | % VOLUMETRIC GROWTH | |
| | AN with 2% KF (hot melt method) | AN with 2% KF (aqueous method) |
| 20 | −3.45 | 2.5 |
| 30 | 4.8 | 5 |
| 40 | 8.3 | 9 (45)-crack) |
| 60 | 11 | >20% crack |

As can readily be seen, the AN with 2% KF made by the hot melt method of U.S. Pat. No. 4,552,736 as well as the AN with 2% KF made by the aqueous method did not produce formulations which exhibit stability. In both cases the thermal cycling resulted in greater than 3% volumetric growth within 30 cycles. In addition, the OMAX 451 formulation grain made by the aqueous method even cracked severely after 45 cycles, a highly undesirable result. Accordingly a safer and more controllable production method remained elusive and a consistently reproducible phase stabilized AN product was still needed.

SUMMARY OF THE INVENTION

In general, when an additive is quantitatively increased in a propellant formulation, the physical properties previously observed tend to be more pronounced. Surprisingly, the expected results did not occur when the concentration of KF was increased to fall within a range of between 3% to 5% using the aqueous method. In this instance, true stabilization of the ammonium nitrate was achieved. Therefore addition of additional amounts of KF beyond 2% is vital to the existence of phase stabilization.

Specifically, the aqueous process of the present invention comprises the steps of:

a) heating an aqueous ammonium nitrate solution to less than $120°$ C. and preferably to about $110°$ C.;

b) dissolving 3.0% to 5.0% by weight potassium fluoride in the aqueous solution;

c) cooling the aqueous solution of potassium fluoride and ammonium nitrate to between about $70°$ C. and about $80°$ C. and preferably to about $77°$ C.; and d) removing the water leaving behind solid ammonium nitrate-potassium fluoride crystals.

DETAILED DESCRIPTION OF THE INVENTION

In accordance with the present invention, the phase stabilized ammonium nitrate basically comprises crystals of ammonium nitrate to which a minimum of 3.0% to a maximum of about 5.0% by weight KF is added. The KF is preferably added using an aqueous process which is inherently much safer than the hot melt process of U.S. Pat. No. 4,552,736.

EXAMPLE

Two batches of stabilized AN were made in a 10 pound size, by heating a 90% aqueous ammonium nitrate solution to about $110°$ C. Potassium fluoride, 3.5% by weight, was added to the aqueous AN solution. The solution was then cooled to about 77° C. and maintained at about 77° C. until the water had evaporated, leaving behind a solid crystallized ammonium nitrate. The resultant crystalline structure was then ground into powder form.

Three different gas generator propellant formulations were then prepared for hot and cold temperature thermal cycling evaluation. Each of the propellant formulations are proprietary to and available from Olin Corporation. Each of the formulations contained the 3.5% KF stabilized AN and a polymer binder. These three formulations are designated below in Table 2 as OCGI. Each of the formulations were also processed with permelene AN (designated below as PSAN) which is the same AN without KF as a control to provide a basis for comparison. The PSAN is a commercially available AN product which is made by Air Products Inc.

The OMAX 451 formulation is a compression molded propellant containing AN and a cis-polybutadiene polymer binder. The 517-14 formulation is a castable propellant containing AN and a carboxyl terminated polyester of adipic acid and diethylene glycol polymer as the binder. The OMAX 601 formulation is a castable propellant containing AN and a hydroxyl terminated polybutadiene (HTPB) as its polymer binder.

The OMAX 601 formulation also contains Milori Blue (a ferric ferro ammonium ferrocyanide) as a burning rate catalyst. It had previously been found that this material degraded the thermal cycling capability of the HTPB type formulations which normally has good thermal cycling capability with PSAN. This formulation was therefore specifically included to evaluate the effect of the OCGI on the HTPB type propellent. As the test results in Table 2 indicate, the thermal cycling capability of the OMAX 601 is greatly enhanced by the use of 3.5% KF.

TABLE 2

THERMAL CYCLING DATA FOR PROPELLANT FORMULATIONS WITH AN (3.5% KF) MADE BY THE AQUEOUS METHOD

| FORMULA-TION NO: | OMAX 451 (Cis-polybutadiene) | | 517-14 (polyester) | | OMAX 601 (HTPB) (Milori blue) | |
|---|---|---|---|---|---|---|
| CYCLES | PSAN | OCGI | PSAN | OCGI | PSAN | OCGI |
| 30 | 9 | 0.45 | 4 | 1.23 | 3.2 | 0.87 |
| 60 | 43 | 2.0 | 14 | 2.70 | 7.91 | 1.35 |

PSAN = formulation having AN without KF
OCGI = formulation having AN with 3.5% KF
Milori blue = ferric ferro ammonium ferrocyanide All of the formulations containing the OCGI (3.5% KF) yielded a volumetric growth of less than 3% after 60 cycles. In fact, the tests of the OMAX 451 formulation have been repeated three times with the same results. It has, however, been observed that the polyester formulation (517-14) physical properties degrade over a period of time, which means that the KF degrades the polyester polymer.

These results clearly show the superior phase stabilization properties of the mixture of AN with KF as an inhibitor when prepared in accordance with the method of the present invention. The superior properties are believed to be achievable between the range of about 3.0 to about 5.0% KF and preferably between about 3.0% and about 4.0% KF. Phase stabilization is optimal at about 3.5%. The 3 5% concentration is believed to be low enough to be acceptable from a corrosion viewpoint in rocket and explosive applications.

In the procedure recited above, the 120° C. temperature is the maximum dissolution temperature. Dissolution is preferably done about 10° C. below this temperature or at about 110° C.

The 77° C. temperature is the preferred temperature for efficient evaporation of the water. However, any temperature between about 70° C. and about 80° C. can also be used. Finally, the water may also be removed by freeze drying, refrigeration, or any other method that does not involve raising the temperature above 40° C.

While the invention has been described above with reference to a preferred embodiment thereof, it is to be understood that variations, changes, modifications and alterations may be made without departing from the intended scope of the invention as defined by the appended claims. Accordingly, it is intended that the invention includes all such variations and alterations. All patents, patent applications, and references identified herein are hereby incorporated by reference in their entirety.

What is claimed is:

1. Crystals comprising a mixture of ammonium nitrate and potassium fluoride wherein the weight percent of potassium fluoride in the mixed crystal is within the range of from about 3.0% to about 5.0%.

2. The crystals according to claim 1 wherein the weight percent of potassium fluoride is between about 3.0% and about 4.0%.

3. The crystals according to claim 2 wherein the weight percent of potassium fluoride is about 3.5%.

4. A method of stabilizing ammonium nitrate which comprises the steps of:
 a) heating an aqueous ammonium nitrate solution to less than about 120° C.;
 b) dissolving from 3.0% to about 5.0% by weight potassium fluoride in the aqueous solution;
 c) cooling the aqueous solution of potassium fluoride and ammonium nitrate to less than about 80° C.; and
 d) maintaining the temperature of the solution at about 77° C. until the water has evaporated leaving behind solid crystals of stabilized ammonium nitrate.

5. The method according to claim 4 which is accomplished by heating the aqueous ammonium nitrate solution to about 110° C.

6. The method according to claim 4 which is accomplished by dissolving from 3.0% to about 4.0% by weight potassium fluoride in the aqueous solution.

7. The method according to claim 6 which is accomplished by dissolving about 3.5% by weight potassium fluoride in the aqueous solution.

8. The method according to claim 7 which is accomplished by dissolving about 3.5% by weight potassium fluoride in the aqueous solution at about 110° C.

* * * * *